United States Patent
Costlow et al.

(10) Patent No.: US 7,676,692 B2
(45) Date of Patent: Mar. 9, 2010

(54) DATABASE AUTOMATED DISASTER RECOVERY

(75) Inventors: Michael T. Costlow, Jacksonville, FL (US); Manas Dasgupta, Alpharetta, GA (US)

(73) Assignee: Bank of America Corporation, Charlotte, NC (US)

(*) Notice: Subject to any disclaimer, the term of this patent is extended or adjusted under 35 U.S.C. 154(b) by 432 days.

(21) Appl. No.: 10/907,840

(22) Filed: Apr. 18, 2005

(65) Prior Publication Data
US 2006/0236151 A1 Oct. 19, 2006

(51) Int. Cl.
*G06F 11/00* (2006.01)

(52) U.S. Cl. .................. 714/16; 707/9; 709/217

(58) Field of Classification Search .......... None
See application file for complete search history.

(56) References Cited

U.S. PATENT DOCUMENTS

| | | | | |
|---|---|---|---|---|
| 5,420,917 A * | 5/1995 | Guzman | ..................... | 379/279 |
| 5,930,824 A * | 7/1999 | Anglin et al. | ................ | 711/162 |
| 6,360,232 B1 * | 3/2002 | Brewer et al. | ................ | 707/204 |
| 2004/0111708 A1 * | 6/2004 | Calder et al. | ................ | 717/131 |
| 2004/0168171 A1 * | 8/2004 | Comparato et al. | ......... | 718/106 |
| 2004/0193969 A1 * | 9/2004 | Nemoto et al. | ............... | 714/100 |
| 2005/0015658 A1 * | 1/2005 | Zohar et al. | .................... | 714/10 |
| 2005/0223046 A1 * | 10/2005 | Smith | .......................... | 707/200 |
| 2006/0047928 A1 * | 3/2006 | Bhasin et al. | ............... | 711/162 |
| 2006/0123208 A1 * | 6/2006 | Johnson | ....................... | 711/162 |
| 2007/0061385 A1 * | 3/2007 | Clark et al. | .................. | 707/204 |

* cited by examiner

Primary Examiner—Don Wong
Assistant Examiner—Shyue Jiunn Hwa
(74) Attorney, Agent, or Firm—Michael A. Springs; Moore & Van Allen PLLC

(57) ABSTRACT

A method of automated disaster site recovery of a DB2 subsystem is presented. The method reads parameters contained in a user modifiable control dataset of recovery parameters for objects, systems, and applications to be recovered. The method also reads a DB2 system catalog containing recovery requirements. The method then creates recovery jobs based on the control dataset parameters and DB2 system catalog requirements. Control cards are created that will automatically submit the recovery jobs to a CA7 scheduling system via a batch terminal interface such that dependent recovery jobs will not be submitted until their pre-requisite recovery jobs have completed. An installation verification job is created that selects a row from each table being recovered and ensures that the recovery was successful. The control dataset can be updated with new application, object, and system recovery parameters on an as needed basis without affecting the recovery job creation process.

4 Claims, 2 Drawing Sheets

DATABASE AUTOMATED DISASTER RECOVERY

BACKGROUND OF INVENTION

With the tremendous growth in the number of DB2 (database) subsystems and production objects requiring Disaster Site Recovery (DSR), the effort to successfully perform recovery testing has become almost unmanageable. Verifying recovery processes and manually executing DSR severely impacts support availability, removing database administrators from their primary production support responsibilities for unacceptable lengths of time.

Recovery processes for each subsystem are typically tested annually. To ensure recovery will perform as expected, database administrators must review all recovery processes for each subsystem prior to each test, verifying that the processes are current with the requirements of the applications, changes to the environment, etc. If upgrades to a DB2 subsystem offer recovery enhancements, all recovery jobs must be manually retrofitted with the changes necessary to take advantage of the enhancements. Since actual resource availability during a DSR test is unknown, attempts to balance recovery workload are "best guess".

Once verified, the database administrator must manually submit and monitor the recovery jobs during the DSR test to ensure problems are identified and corrected quickly. When recovery of an object is complete, the database administrator must manually search through the job output and record the start and end times for reporting purposes.

What is needed is a flexible process that automatically creates all of the jobs necessary to perform DSR for all applications in a DB2 subsystem.

SUMMARY OF INVENTION

The present invention automates nearly all manual processes using a disaster site recovery generator (DSRGEN) process. Database Administrators provide the recovery information for applications for which they are responsible. DSR support staff (i.e., CA7 support, DB2 systems programming, DSR coordinator) provide environmental information for the subsystem and logical partition (LPAR) being recovered. Using this information, DSRGEN creates all of the recovery jobs at the DSR site just prior to recovery. Skeleton Job Control Language (JCL) ensures that all enhancements are automatically included in each recovery job meaning a manual retrofit is no longer required. The control cards and jobs necessary to invoke automatic submission of jobs via CA7 are created meaning that manual submission and monitoring of jobs is also no longer required. CA7 is a production control system that automatically controls, schedules, and initiates work according to time-driven and/or event-driven activities. Reports are created detailing all activity. An Installation Verification Procedure (IVP) job is created that verifies the successful recovery of each object meaning that manual verification is no longer required. Statistics are automatically created in load format to be stored in DB2 historical tables obviating the need to manually collect the data. Also, by creating recovery jobs at the object level, load balancing can be adjusted as needed during the DSR test by adjusting the number of concurrent recoveries executing.

DETAILED DESCRIPTION

Figure 1:
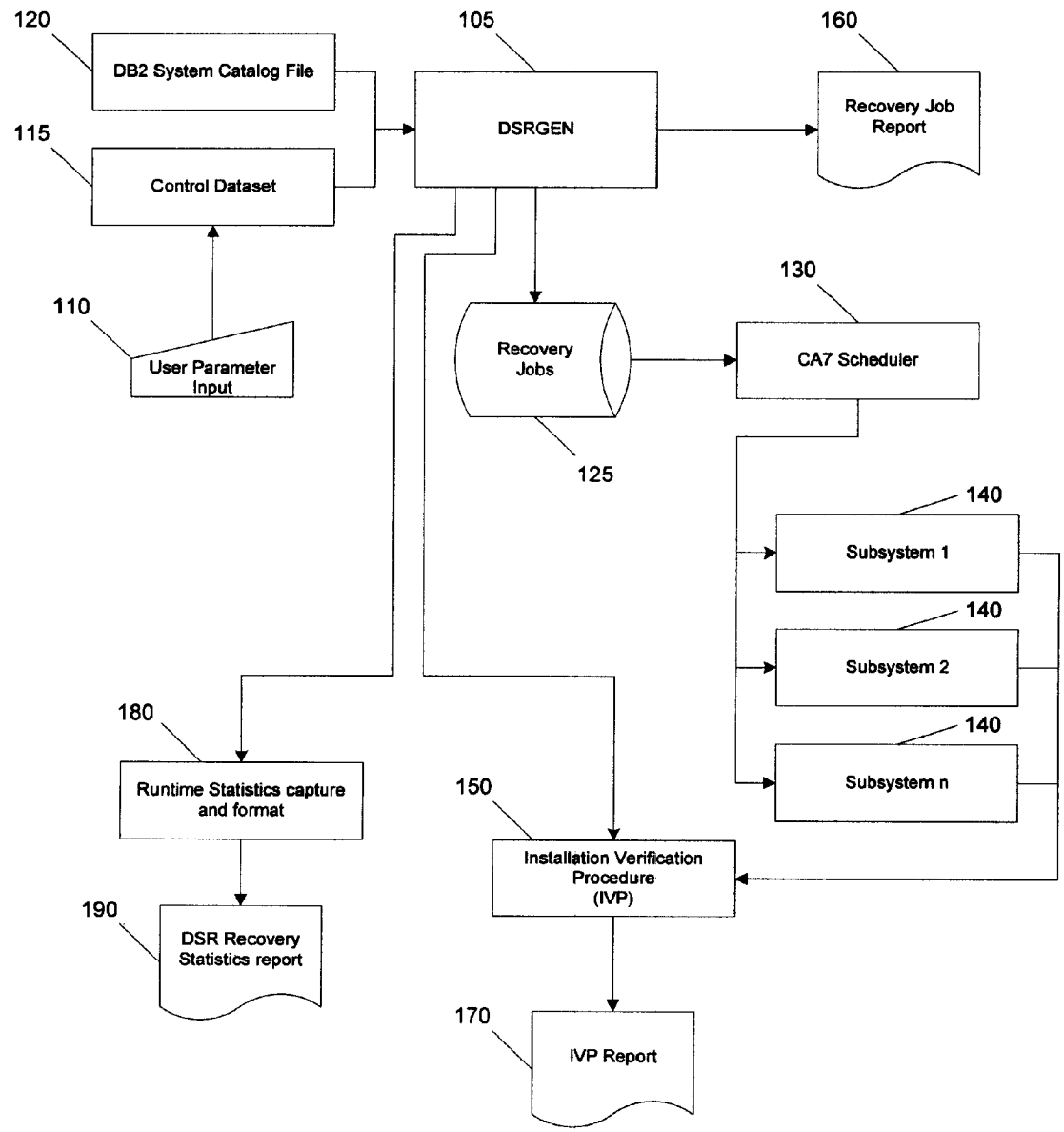
FIG. 1 is a functional block diagram of the present invention.

It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps. With respect to flow charts, block diagrams, and flow diagrams, not every possible signal flow, data path or process block is shown. Rather, for clarity, only those important to the inventive concepts being discussed relative to the drawing may be illustrated, although others may be discussed.

It should be understood that terms like "bank," "financial institution," and just "institution" if used herein are used in their broadest sense. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems [or even a single work station] NEED CLARIFICATION if appropriate databases are present and can be accessed.

A logical partition (LPAR) is the method by which a physical mainframe computer is divided into virtual systems. The resources of the physical mainframe computer (memory, disk, tape, CPU, etc.) are divided up and allocated across one or more logical partitions, and each partition runs as though it is a stand-alone computer. To the clients and processes using the LPAR, it looks just like a stand-alone system, even though it is running on the same real, physical mainframe with all other LPARs. There may be multiple LPARs running together on a single physical mainframe computer. The configuration of each LPAR depends on its purpose and the availability of resources.

Within each LPAR, there may be one or more DB2 subsystems running at any time. The number and configuration of the DB2 subsystems depends on their purpose and the availability of resources. The DB2 subsystem manages all of the data allocated to it, and satisfies requests for access to the data in the most efficient manner possible.

Within each DB2 subsystem, there may be one or more databases defined. A database is a logical grouping of related data, such as customer data, account data, marketing data, etc. The database is the highest level of definition for data.

Within each database, there may be one or more tablespaces defined. The definition of the tablespace depends on the storage needs of the application. The creation of the tablespace is the point at which a physical dataset is created on a disk device. All recoveries are done at the tablespace level.

Within each tablespace, there may be one or more tables defined. The table describes the logical layout of the data, defining each column within a record, including its attributes and default values.

Thus, a physical mainframe computer may be comprised of one or more logical partitions. An LPAR may host one or more DB2 subsystems. A DB2 subsystem may contain one or more databases. A database may include one or more tablespaces. And, a tablespace may have one or more tables. The present invention is directed to disaster site recovery (DSR) of the DB2 subsystems.

FIG. 1 is a functional block diagram of the present invention. It should be noted that FIG. 1 is a functional block diagram, rather than a physical element-by-element illustration of the present invention. As such, many of the functional blocks illustrated in FIG. 1 may be combined into a single physical element. On the other hand, the functional blocks may also be implemented across several physical elements. The present invention is not limited by the physical implementation of the functional blocks illustrated in FIG. 1.

The DSRGEN REXX program 105 has automated nearly every task of DB2 Disaster Site Recovery. Database administrators and other DSR support teams simply identify and input 110 parameters specific to the applications and environment being recovered. The DSRGEN REstructured eXtended eXecutor (REXX) program reads these application and environmental parameters from a control dataset 115 as well as the recovery requirements from the DB2 system catalog 120 and generates the appropriate recovery job(s) 125.

Based on the type of tablespace being recovered, DSRGEN 105 will generate list definition (LISTDEF) control cards to increase recovery parallelism. For backups that are stacked on tape, DSRGEN 105 will group related tablespace recoveries in stacked order to minimize tape mount/dismount time. A job will be created to rebuild the indexes for each tablespace being recovered, and index rebuild parallelism will be used when more than one index is present for a given tablespace. DSRGEN 105 builds the control cards necessary to automatically submit the jobs through a CA7 job scheduling subsystem 130, including a dependency that tablespace recoveries must successfully complete before their related index rebuild jobs are submitted. A recovery job report 160 is created detailing all of the recovery job generation activity including an index of the jobs being generated, as well as an application recovery status checklist for making notes of recovery activities. A CA7 batch terminal interface (BTI) job is generated which will be used to connect to CA7 130 and begin the automated job submission to rebuild the appropriate subsystems 140. An installation verification procedure (IVP) job 150 is created to select a single row from each table being recovered to ensure recovery was successful and the data is available. A job is also generated to collect the runtime statistics for all recovery jobs and generate a fixed-format file 180 to load into historical tables for reporting and trending. A database administrator initiates recovery by submitting the CA7 BTI job. After that, all jobs are submitted and monitored by the CA7 job scheduling subsystem 130, and dependent jobs are submitted automatically as soon as their prerequisite jobs complete successfully. After all recovery jobs are complete, the IVP job 150 and post-DSR reporting and statistics jobs are executed to create the various reports 170, 190.

Figure 2:
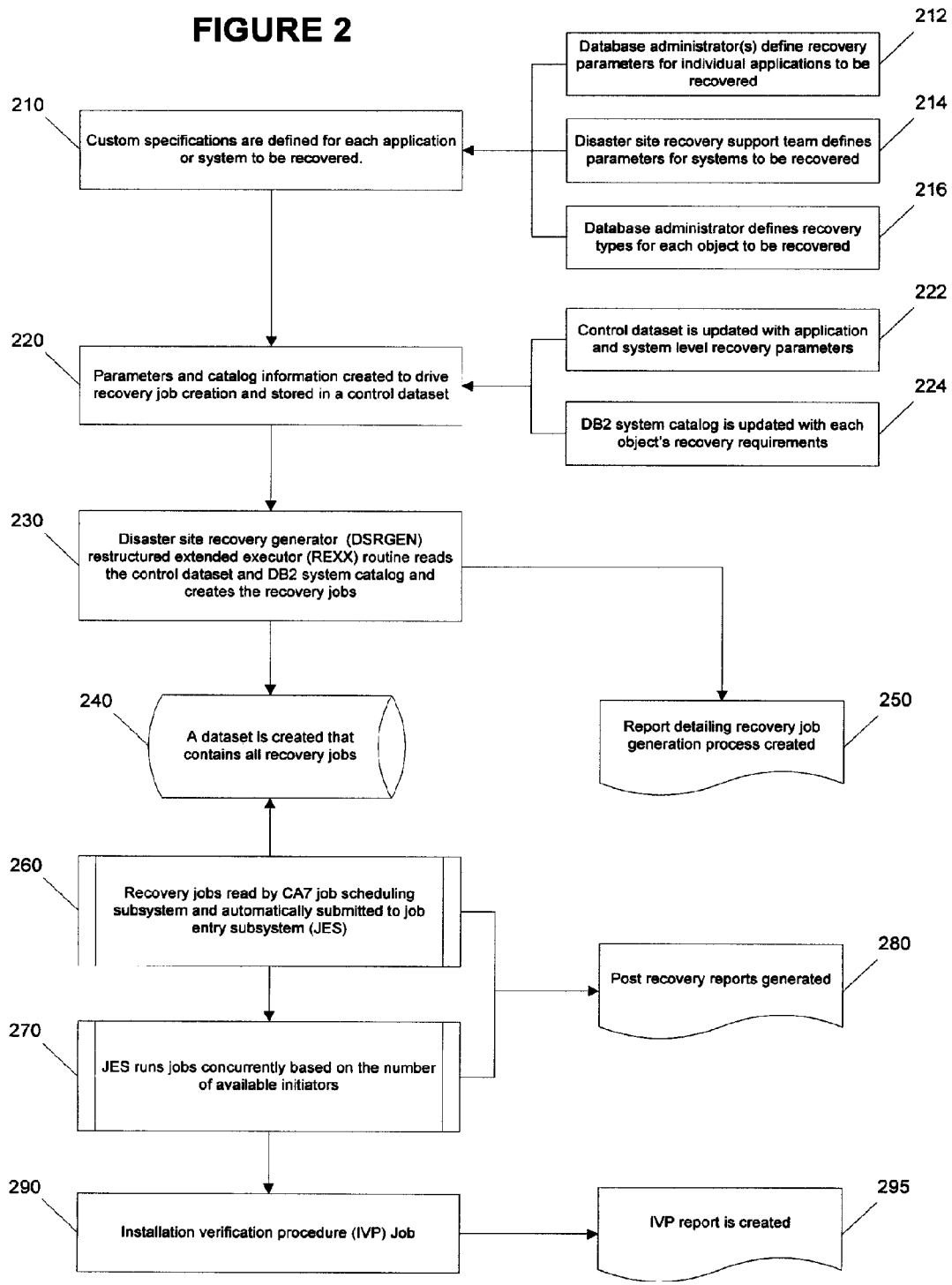
FIG. 2 is a flowchart of the present invention.

FIG. 2 is a flowchart of the present invention. The first step is to create and define custom specifications for each application or system to be recovered 210. Database Administrators work with clients and application developers to determine which applications are required for recovery and their recovery priority (high, medium, or low). Database Administrators and other support personnel also define specific parameters required to successfully recover each LPAR (Logical Partition) and DB2 subsystem. Parameters detailing the recovery requirements for each application 212 and object 216 are created and stored in a DB2 system catalog entry for that object. Each DSR support team (e.g., HAS, CA7, DB2 DBA, DB2 Technical Support, etc.) determines the recovery parameters applicable for their area of responsibility for the subsystems to be recovered 214. The parameters determined are stored in a control dataset 220, one dataset for each subsystem to be recovered. Once established, these parameters need only be changed if the recovery requirements change.

The control dataset is updated with application and system level recovery parameters on an as needed basis 222. The control dataset is also updated with object recovery parameters on an as needed basis 224.

A disaster site recovery generator (DSRGEN) REstructured extended eXecutor (REXX) routine reads the parameters from the control dataset and the recovery requirements for each object from the DB2 system catalog and generates the recovery JCL (Job Control Language) job streams 230. Based on the type of tablespace being recovered, DSRGEN will generate list definition (LISTDEF) control cards to increase recovery parallelism. For backups that are stacked on tape, DSRGEN will group related tablespace recoveries in stacked order to minimize tape mount/dismount time. Job(s) will be created to rebuild the indexes for each tablespaces being recovered, and index rebuild parallelism will be used when more than one index is present for a given tablespace. DSRGEN builds the control cards necessary to automatically submit the jobs through the CA7 job scheduling subsystem, with a dependency that tablespace recoveries successfully complete before their related index rebuild jobs are submitted. The JCL recovery job streams are written to a JCL library (LIB) partitioned dataset (PDS) 240. If needed, modifications to recovery jobs can be applied in this dataset without the need to regenerate the entire recovery.

A recovery job report 250 is created detailing all of the recovery job generation activity including an index of the jobs being generated, as well as an application recovery status checklist for making notes of recovery activities. A CA7 Batch Terminal Interface (BTI) job is generated to connect to CA7 scheduling. When the DBA is ready to begin recovery, the CA7 BTI job is submitted and causes CA7 to read and submit the recovery jobs based on job dependencies 260. As prerequisite jobs successfully complete, dependent jobs will be automatically submitted. If a job abnormally terminates, CA7 places it in the abend queue and the DBA is alerted. If needed, modifications are made to the job and it is resubmitted via CA7. Jobs submitted for execution go into the JES input queue. The number of concurrently executing jobs is controlled by increasing or decreasing the number of available JES initiators 270. When all recovery jobs have finished, post-DSR reports are created from CA7 and JES 280.

An Installation Verification Procedure (IVP) job 290 is created to select a single row from each table being recovered to ensure recovery was successful and the data is available. The results of the IVP job are output an IVP report 295.

The DSRGEN process of the present invention provide for many advantages in disaster site recovery. The database administrators and DSR Support Staff have full control over if/how objects will be recovered by use of simple substitution parameters. DSRGEN integrates with the CA7 job scheduling subsystem to automatically submit and monitor jobs, including job dependencies. Recovery is designed at the object level, giving a greater level of granularity and providing the mechanism to balance recovery workload against system resources by increasing or decreasing the number of concurrent recovery jobs. The DSRGEN process is written in the REstructured eXtended eXecutor (REXX) programming language, and therefore highly portable and easily customized as needed for enhancements and compatibility. Image copy information in the system catalog can be used to identify stacked tape backups and recovery can be tailored to the stacking order to limit tape mount/dismount. Recovery statistics are automatically gathered and loaded into historical tables for reporting and trending. The recovery type for each object is kept in a user-defined field in the DB2 system catalog and will therefore always be current with the recovered DB2 subsystem.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media could be a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device.

Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

What is claimed is:

1. A method of automated disaster site recovery of a relational database subsystem comprising:
   automatically accessing and reading parameters contained in a user modifiable control dataset, a control dataset defining recovery parameters for objects, systems, and applications to be recovered;
   automatically accessing and reading a relational database system catalog containing recovery requirements;
   automatically creating recovery jobs based on the control dataset parameters and relational database system catalog requirements;
   automatically creating control cards that will automatically submit the recovery jobs to a computer batch scheduling system such that dependent recovery jobs will not be submitted until their pre-requisite recovery jobs have successfully completed, wherein pre-requisite recovery jobs include one or more tablespace recovery jobs and their respective dependent recovery jobs include one or more index rebuild recovery jobs and wherein the control cards include list definition (LISTDEF) control cards designed to increase job recovery parallelism; and
   automatically creating an installation verification job that selects a row from each table being recovered and ensures that the recovery was successful and that the table data is available,
   wherein one job of the recovery jobs collects run-time statistics for all the recovery jobs and generates a file useable for reporting and trending and wherein the control dataset is configurable to be updated with revised or new application, object and system recovery parameters on an as needed basis without affecting the recovery job creation process.

2. The method of claim 1 wherein the recovery jobs are submitted to the computer batch scheduling system via a batch terminal interface job.

3. An apparatus comprising a storage medium with instructions stored therein, the instructions when executed causing a processing device to perform:
   automatically accessing and reading parameters contained in a user modifiable control dataset, a control dataset defining recovery parameters for objects, systems, and applications to be recovered;
   automatically accessing and reading a relational database system catalog containing recovery requirements;
   automatically creating recovery jobs based on the control dataset parameters and relational database system catalog requirements;
   automatically creating control cards that will automatically submit the recovery jobs to a computer batch scheduling system such that dependent recovery jobs will not be submitted until their pre-requisite recovery jobs have successfully completed, wherein pre-requisite recovery jobs include one or more tablespace recovery jobs and their respective dependent recovery jobs include one or more index rebuild recovery jobs and wherein the control cards include list definition (LISTDEF) control cards designed to increase job recovery parallelism; and
   automatically creating an installation verification job that selects a row from each table being recovered and ensures that the recovery was successful and that the table data is available,
   wherein one job of the recovery jobs collects run-time statistics for all the recovery jobs and generates a file useable for reporting and trending and wherein the control dataset is configurable to be undated with revised or new application, object and system recovery parameters on an as needed basis without affecting the recovery job creation process.

4. The apparatus of claim 3 wherein the recovery jobs are submitted to the computer batch scheduling system via a batch terminal interface job.

* * * * *